Feb. 16, 1926.
A. P. KAY
KETTLE
Filed Nov. 19, 1925
1,573,250
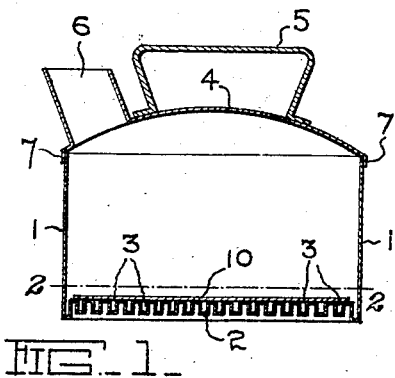
FIG_1_
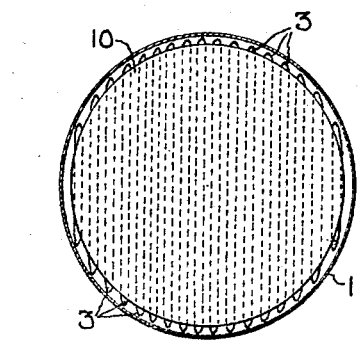
FIG_2_
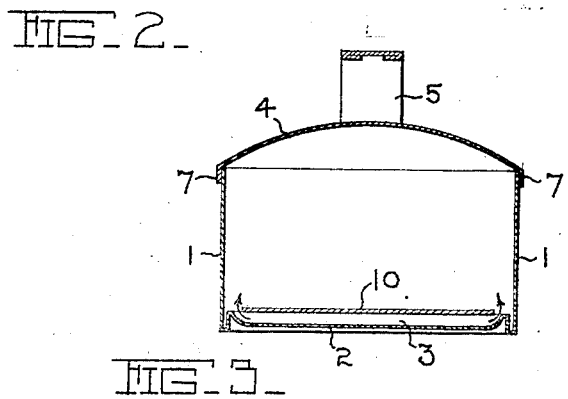
FIG_3_
Inventor
A. P. Kay
by Langner Perry Card & Langner
Attys Patented Feb. 16, 1926.

1,573,250

UNITED STATES PATENT OFFICE.

ARTHUR PERCY KAY, OF AUCKLAND, NEW ZEALAND.

KETTLE.

Application filed November 19, 1925. Serial No. 70,165.

*To all whom it may concern:*

Be it known that I, ARTHUR PERCY KAY, citizen of the Dominion of New Zealand, residing at Auckland, in the Provincial District of Auckland, in the Dominion of New Zealand, have invented certain new and useful Improvements in Kettles, of which the following is a specification.

This invention relates to kettles and other water heating utensils, of the type provided with an upwardly recessed, stepped or pocketed bottom, or with a false bottom or plate, between which and the bottom proper, water passes, for the purpose of enabling water to be quickly heated.

The object of the present invention is to provide improvements in the aforesaid type of kettle or utensil, said improvements consisting in forming the kettle or utensil with a concave, dished or upwardly recessed bottom containing a number of parallel, deep, narrow grooves or corrugations extending from side to side of the kettle or utensil, a circular metal plate having a diameter slightly less than the interior diameter of the body of the kettle being secured on top of said grooves or corrugations. The fact that this disc or plate is of smaller diameter than the bottom of the kettle, leaves the ends of the grooves or corrugations open to the interior of the kettle, with the result that water placed in the body of the kettle is permitted to circulate through the passages provided beneath the disc, by the grooves or corrugations, thereby forming the bottom of the kettle into a miniature tubular boiler in which the water is separated into a number of small streams which can be rapidly heated, and which give a vigorous circulation to the main body of water in the kettle.

These tubes are preferably oval in cross section so as to increase their relative external surface which is presented to the fire or other heating element over those of circular form.

In the case of kettles heated by electric means, the heating elements can be positioned around the water tubes or corrugations or in circular rings located underneath the water tubes or corrugations.

The invention will be more particularly described with the aid of the accompanying drawing, wherein:—

Figure 1 is a vertical section of a kettle provided with a corrugated bottom,

Figure 2 is a horizontal section on line 2—2 of Figure 1,

Figure 3 is a vertical section taken at right angles to that shown in Figure 1.

The sides 1 and bottom 2 of the kettle are preferably stamped or pressed from a single sheet of metal, while the said bottom 2 also has stamped therein a number of deep narrow grooves or corrugations 3 extending from side to side of the kettle.

The grooves or corrugations 3 are tapered towards their ends to allow of their being stamped into the metal of the bottom 2 without fracturing the metal.

The bottom 2 of the kettle is concaved or recessed upwards in order to provide that the grooves or corrugations 3 formed therein will be above the level of the lower edges of the sides, the weight of the kettle being supported on the latter.

The top 4 of the kettle is of any desired shape or design and is provided with a handle 5, which can if desired be insulated, and a spout 6, and is secured to the upper edges of the kettle sides by means of a convenient joint 7.

A disc 10 of slightly smaller diameter than the interior diameter of the body of the kettle, is fastened on top of the bottom 2 to close the tops of the grooves or corrugations 3 except at the ends of the latter which open into the interior space of the kettle. The grooves or corrugations 3 are thus formed into water tubes through which water from the body of the kettle is adapted to circulate in close proximity to the flame or hot gases arising from the heating appliance, with the result that such water is rapidly heated and a considerable saving of fuel effected.

Instead of forming the disc 10 of slightly smaller diameter than the diameter of the interior of the kettle body said disc 10 can be formed to cover the whole of the bottom 2, and have small holes formed therethrough to provide communication between the ends of the grooves or corrugations 3 and the interior of the kettle.

I declare that what I claim and desire to obtain by Letters Patent of the United States of America is:—

1. A kettle, comprising, a bottom and sides in one piece, the bottom having an upwardly dished portion, the dished portion being provided with parallel corrugations having upwardly turned tapered ends and extending substantially from edge to edge of the dished portion, and a disk of slightly less diameter than the length of the longest corrugation, the disk being centrally positioned on the corrugations inside of the kettle so as to leave the upturned ends of the corrugations open.

2. A kettle, comprising, a bottom and sides in one piece, the bottom having an upwardly dished portion, the dished portion being provided with parallel corrugations having upwardly turned tapered ends and extending substantially from edge to edge of the dished portion, and a disk of slightly less diameter than the length of the longest corrugation, the disk being centrally positioned on the corrugations inside of the kettle so as to leave the upturned ends of the corrugations open, the lower edges of the corrugations being in a common plane which is above the plane of the lower edge of the kettle sides.

Signed at Auckland, in the Provincial District of Auckland, in the Dominion of New Zealand, this tenth day of October, 1925.

ARTHUR PERCY KAY.